(12) United States Patent
Yamaguchi et al.

(10) Patent No.: US 10,221,788 B2
(45) Date of Patent: Mar. 5, 2019

(54) ENGINE CONTROLLER

(71) Applicant: MITSUBISHI JIDOSHA KOGYO KABUSHIKI KAISHA, Tokyo (JP)

(72) Inventors: Takafumi Yamaguchi, Tokyo (JP); Kuniki Kanayama, Tokyo (JP); Keita Nakamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 650 days.

(21) Appl. No.: 14/854,710

(22) Filed: Sep. 15, 2015

(65) Prior Publication Data

US 2016/0090930 A1 Mar. 31, 2016

(30) Foreign Application Priority Data

Sep. 30, 2014 (JP) .................................. 2014-200451

(51) Int. Cl.
*F02D 41/02* (2006.01)
*F02D 41/30* (2006.01)
*F02D 41/14* (2006.01)

(52) U.S. Cl.
CPC ....... *F02D 41/0225* (2013.01); *F02D 41/023* (2013.01); *F02D 41/1444* (2013.01);
(Continued)

(58) Field of Classification Search
CPC ............... F02D 41/0225; F02D 41/023; F02D 41/3011; F02D 41/3017; F02D 41/3023; F02D 41/3029; F02D 41/3035; F02D 41/3041; F02D 41/3047; F02D 41/3064; F02D 41/307; F02D 41/3076; F02D 41/402; F02D 41/0057; F02D 2250/21;
(Continued)

(56) References Cited

U.S. PATENT DOCUMENTS 6,026,781 A 2/2000 Imatake et al.
6,623,401 B2 * 9/2003 Idogawa ............... F02B 17/005
123/295

(Continued)

FOREIGN PATENT DOCUMENTS

CN 1993543 A 7/2007
CN 102066732 A 5/2011
(Continued)

OTHER PUBLICATIONS

Chinese Office Action dated Oct. 31, 2017 issued in counterpart Chinese Patent Application No. 201510632156.6 with an English Translation.
(Continued)

*Primary Examiner* — Jacob M Amick
*Assistant Examiner* — Michael A Kessler
(74) *Attorney, Agent, or Firm* — Birch, Stewart, Kolasch & Birch, LLP

(57) ABSTRACT

A controller of an engine performing a premixed combustion operation and a diffusion combustion operation that are switchable in accordance with the traveling state of a vehicle, includes a detector detecting the gear position of the transmission mounted in the vehicle, and a changer changing the traveling conditions for performing the premixed combustion operation on the basis of the gear position detected by the detector.

10 Claims, 4 Drawing Sheets

(52) U.S. Cl.
CPC ..... *F02D 41/3035* (2013.01); *F02D 41/3047* (2013.01); *F02D 41/3076* (2013.01); *Y02T 10/128* (2013.01)

(58) Field of Classification Search
CPC ..... Y02T 10/128; Y02T 10/18; Y02T 10/123; F02P 5/1504; F02B 2275/16
USPC .......................................... 123/299, 295, 431
See application file for complete search history.

(56) References Cited

U.S. PATENT DOCUMENTS

| | | | | |
|---|---|---|---|---|
| 6,745,743 | B2* | 6/2004 | Abo | F02B 17/005 |
| | | | | 123/295 |
| 7,165,527 | B2* | 1/2007 | Okude | F02D 35/025 |
| | | | | 123/299 |
| 7,207,315 | B2 | 4/2007 | Maruyama | |
| 7,669,578 | B2* | 3/2010 | Yamashita | F02B 17/00 |
| | | | | 123/295 |
| 7,677,222 | B2 | 3/2010 | Ishikawa | |
| 7,729,843 | B2 | 6/2010 | Ishikawa | |
| 7,866,148 | B2* | 1/2011 | O'Neill | F01N 3/0842 |
| | | | | 123/568.11 |
| 8,776,762 | B2* | 7/2014 | Rayl | F02D 41/3035 |
| | | | | 123/295 |
| 8,851,049 | B2 | 10/2014 | Ootaki et al. | |
| 2003/0140629 | A1 | 7/2003 | Shirakawa | |
| 2003/0230276 | A1* | 12/2003 | Kataoka | F02B 1/12 |
| | | | | 123/295 |
| 2009/0024305 | A1 | 1/2009 | Ishikawa | |
| 2011/0098907 | A1 | 4/2011 | Ootaki et al. | |
| 2015/0275811 | A1* | 10/2015 | Tanaka | F02D 41/3041 |
| | | | | 701/105 |

FOREIGN PATENT DOCUMENTS

| | | |
|---|---|---|
| DE | 198 48 605 A1 | 7/1999 |
| EP | 1 983 179 A1 | 10/2008 |
| EP | 3 002 438 A1 | 4/2016 |
| JP | 2005-325811 A | 11/2005 |
| JP | 2006-9736 A | 1/2006 |
| JP | 3931900 B2 | 6/2007 |
| JP | 2009-209809 A | 9/2009 |
| JP | 5447294 B2 | 3/2014 |

OTHER PUBLICATIONS

Extended European Search Report dated Nov. 10, 2016 issued in corresponding European Patent Application No. 15184427.1.

\* cited by examiner

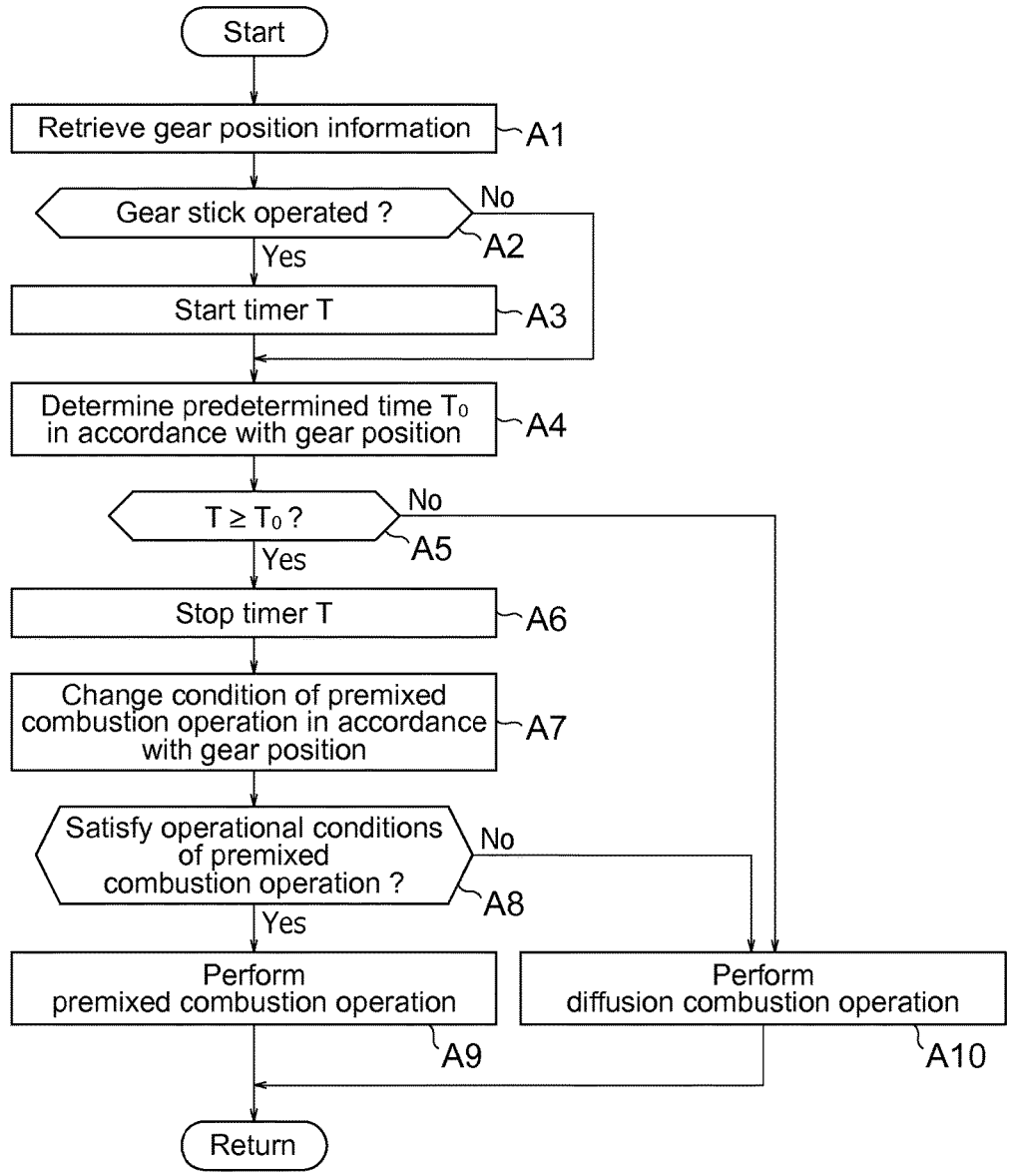

ENGINE CONTROLLER

CROSS-REFERENCE TO THE RELATED APPLICATION

This application incorporates by references the subject matter of Application No. 2014-200451 filed in Japan on Sep. 30, 2014 on which a priority claim is based under 35 U.S.C. § 119(a).

FIELD

The present invention relates to a controller of an engine performing a premixed combustion operation and a diffusion combustion operation that are switchable in accordance with the traveling state of a vehicle.

BACKGROUND

Many kinds of technique have been recently proposed to switch the combustion state in engine cylinders in accordance with the traveling state of a vehicle, that is, to perform both premixed combustion and diffusion combustion in one engine. The premixed combustion is a state of burning a premix of fuel and oxygen (oxidant) in, for example, a spark-ignition gasoline engine that injects fuel into an intake port. The diffusion combustion is a state of burning a somewhat inhomogeneous mixture of fuel and oxygen (combustion with diffusion of fuel and oxygen) in, for example, a compression-ignition diesel engine that injects fuel directly into the cylinders.

Diesel engines achieving these two burning states are called premixed charge compression ignition (PCCI) engines, homogeneous charge compression ignition (HCCI) engines, and controlled auto ignition (CAI) engines. Another technique has been also developed today in order to achieve the two burning states in one spark-ignition gasoline engines. This technique conduces to premixed compression self-igniting combustion in the gasoline engines.

The premixed combustion, combustion of a lean mixture, has a lower combustion temperature and emits less NOx (nitrogen oxide) and soot than the diffusion combustion. Achieving the premixed combustion in the engine of a vehicle of which NOx and soot emission is regulated improves the emission performance of the vehicle. (See Japanese Patent No. 5447294 and No. 3931900.)

SUMMARY

Technical Problems

Unfortunately, the premixed combustion often generates loud noise (undesired sound) because the combustion reaction proceeds and finishes in a shorter time than in the diffusion combustion. Hence, it is difficult to maintain the quietness of the vehicle while improving the emission performance and thus to improve the riding comfort (feeling of driving).

An object of the present invention, which has been conceived in light of the problems described above, is to provide an engine controller that improves the emission performance and quietness of a vehicle. Another object of the present invention is to achieve advantageous effects that cannot be achieved through the traditional art by employing the configurations described below in the embodiments of the present invention.

Solution to Problems (1) A disclosed engine controller performs a premixed combustion operation and a diffusion combustion operation that are switchable in accordance with a traveling state of a vehicle. The engine controller includes a detector detecting a gear position of a transmission mounted in the vehicle, and a changer changing operational conditions of the premixed combustion operation on the basis of the gear position detected by the detector.

The premixed combustion operation is an operating state of substantially uniformly distributing fuel and oxygen in the cylinders of the engine and burning the resultant mixture by self-ignition. The diffusion combustion operation is an operating state of generating a somewhat inhomogeneous mixture of the fuel and the oxygen and burning the mixture by self-ignition. The intake-air oxygen level in the premixed combustion operation is controlled to be lower than that in the diffusion combustion operation.

(2) The changer preferably increases an upper limit of the engine speed among the operational conditions as a reduction ratio of the gear position decreases.

(3) The changer preferably increases the upper limit of the engine speed among the operational conditions if the reduction ratio is lower than a first reduction ratio, compared to the case where the reduction ratio is equal to or higher than the first reduction ratio, and increases an upper limit of an engine load among the operational conditions if the reduction ratio is lower than a second reduction ratio lower than the first reduction ratio, compared to the case where the reduction ratio is equal to or higher than the second reduction ratio.

(4) The changer preferably increases the upper limit of the engine load among the operational conditions if the reduction ratio of the gear position decreases.

(5) The engine controller preferably includes a controller forbidding the premixed combustion operation and performing the diffusion combustion operation after the gear position is changed and at least before a predetermined time elapses.

(6) The predetermined time preferably decreases as the reduction ratio of the gear position decreases.

(7) The predetermined time is preferably a time required until a difference between a target value and an actual value of each of a boost pressure and an intake-air oxygen level of the engine is equal to or smaller than a predetermined value.

Advantageous Effects

The engine controller in accordance with the present invention can accurately determine a traveling state in which noise generated in the premixed combustion operation is readily blocked (masked) by changing the conditions of switching the two combustion operations on the basis of the gear position. This improves the emission performance and riding comfort and thus improves the emission performance and quietness of the vehicle.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIG. 5 is a flowchart of the procedure of combustion switching control.

DESCRIPTION OF EMBODIMENTS

An engine controller will now be described with reference to the accompanying drawings. The embodiments described below are merely examples, and various modifications and technological applications that are not described in the embodiments should not be excluded from scope of the invention. The configurations according to the embodiments maybe modified in various ways without departing from the scope of the embodiment. Such configurations may also be selected and/or be combined appropriately.

[1. Engine]

Figure 1:
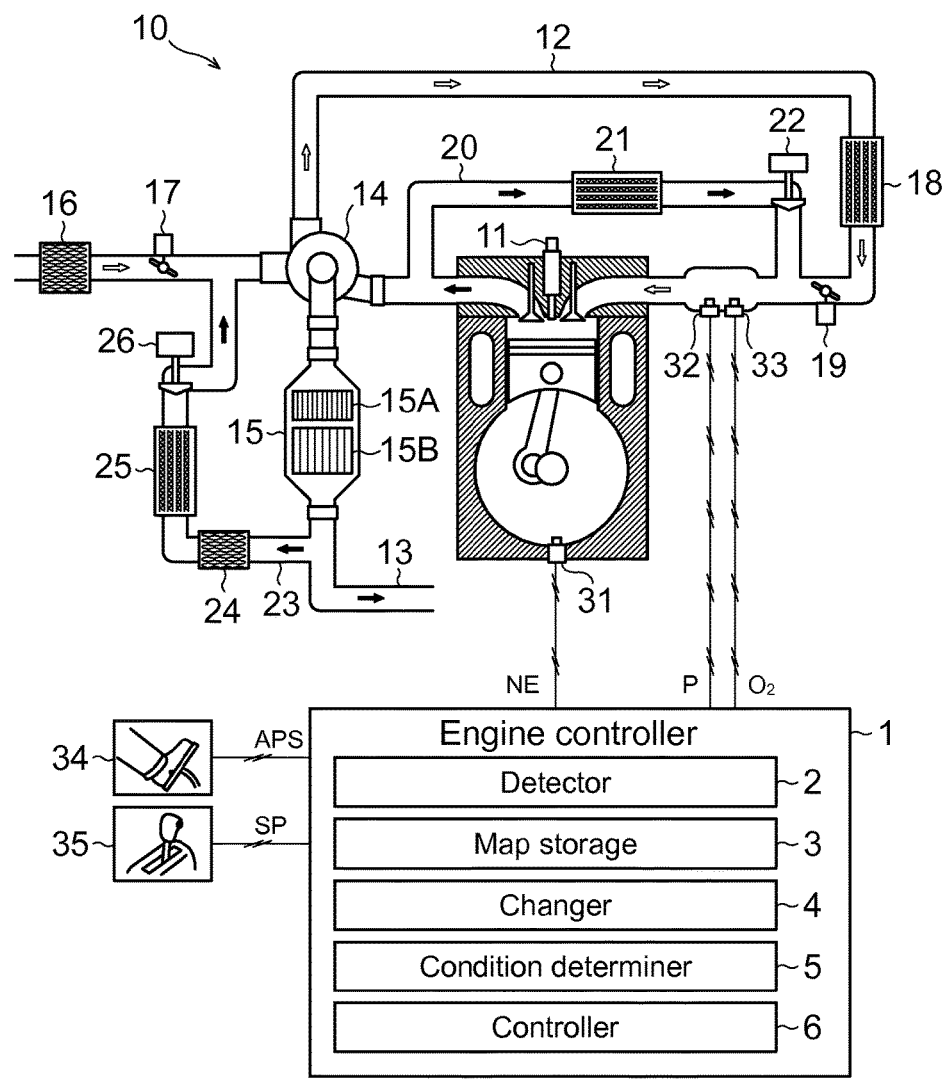
FIG. 1 is a schematic diagram of an engine controller in accordance with an embodiment of the present invention.

An engine controller 1 in accordance with this embodiment is applied to a vehicle equipped with an engine 10 illustrated in FIG. 1. FIG. 1 illustrates one of the multiple cylinders formed in the engine 10. The engine 10 is a diesel engine that runs on light oil and is switchable between a diffusion combustion operation and a premixed combustion operation in accordance with the traveling state of the vehicle. The diffusion combustion operation enables diffusion combustion (diffusion compression self-ignition combustion) in the cylinder of the engine 10. The premixed combustion operation enables premixed combustion (premixed compression self-ignition combustion) in the cylinder of the engine 10. The engine 10 in accordance with this embodiment operates in these two combustion states in accordance with the traveling state of the vehicle.

The cylinder is provided with an intake port and an exhaust port on the top surface, and the intake port and the exhaust port are provided with an intake valve and an exhaust valve, respectively, at their respective openings. The cylinder is provided with a direct injection valve 11 at the upper part in the cylinder in such a manner that the tip of the injection valve protrudes toward a combustion chamber. The direct injection valve 11 is a direct injector for injecting fuel into the cylinder and is connected to a common rail (accumulator) storing high-pressure fuel inside.

The engine controller 1 controls the injection rate of fuel supplied from the direct injection valve 11 and an injection timing. For example, the engine controller 1 sends a control pulse signal to the direct injection valve 11, and then the injection hole of the direct injection valve 11 opens in a period corresponding to the magnitude of the control pulse signal. This enables the fuel injection rate to correspond to the magnitude of the control pulse signal (drive pulse width) and the fuel injection timing to correspond to the time at which the control pulse signal is sent.

Figure 2A:
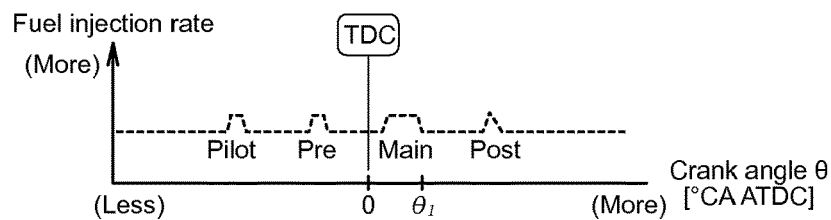
FIG. 2A is a graph showing a fuel injection pattern in a diffusion combustion operation.

FIG. 2A illustrates a fuel injection pattern in the diffusion combustion operation in the case of four injection stages including a pilot injection stage, a pre-injection stage, a main injection stage, and a post-injection stage. The pilot injection and the pre-injection are performed on a compression stroke. The main injection, which contributes to the engine output most, is performed before or after the top dead center (TDC) just behind the compression stroke. The post-injection is performed after the TDC, in other words, from combustion stroke downward. The heat release rate in the diffusion combustion operation is highest immediately after the main injection, as represented by the dashed line in FIG. 2C. The time (ignition delay) from the completion time $\theta_1$ of the main injection to an ignition time $\theta_2$ is relatively short, and ignition may occur in the main injection. The cylinder pressure in the diffusion combustion operation fluctuates relatively gradually, as represented by the dashed line in FIG. 2D.

Figure 2B:
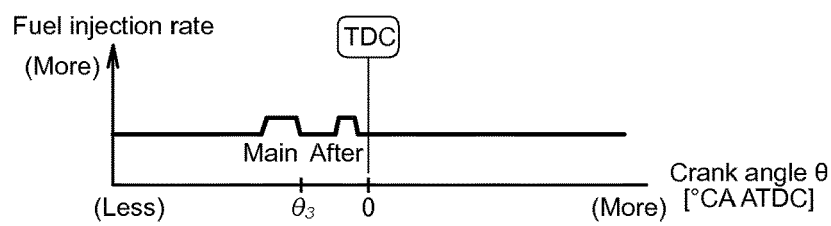
FIG. 2B is a graph showing a fuel injection pattern in a premixed combustion operation.
Figure 2C:
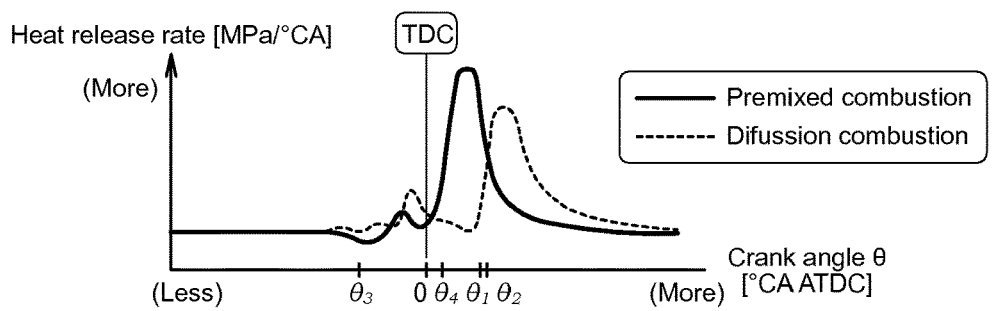
FIG. 2C is a graph showing heat release rates.
Figure 2D:
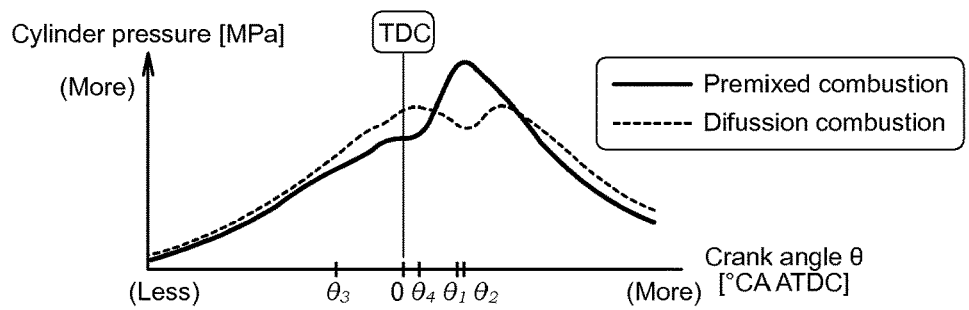
FIG. 2D is a graph showing cylinder pressures.

FIG. 2B illustrates a fuel injection pattern in the premixed combustion operation. Pilot injection stage, pre-injection stage, and post-injection stage are omitted in the premixed combustion operation, but main injection stage is performed on a compression stroke. Auxiliary after-injection stage is performed before or after the TDC. The heat release rate in the premixed combustion operation is highest after an elapse of a predetermined premixing period from the main injection, as represented by the solid line in FIG. 2C. The ignition delay from the completion time $\theta_3$ of the main injection to an ignition time $\theta_4$ is longer than that in the diffusion combustion operation. The cylinder pressure in the premixed combustion operation varies more sharply than in the diffusion combustion operation, which is graphed in a peaked manner as represented by the solid line in FIG. 2D.

The engine 10 includes an intake path 12 and an exhaust path 13 with a turbocharger 14 interposed therebetween for supercharging the engine by forcibly feeding air in the intake path 12 into the cylinder using exhaust pressure. The intake path 12 is provided with an air cleaner 16, a low-pressure throttle valve 17, the turbocharger 14, an intercooler 18, and a high-pressure throttle valve 19 in this order from the upstream side. The exhaust path 13 is provided with an exhaust emission controller 15 disposed downstream of the turbocharger 14. The exhaust emission controller 15 includes a diesel oxidation catalyst (DOC) 15A and a diesel particulate filter (DPF) 15B.

The engine 10 includes a high-pressure EGR path 20 and a low-pressure EGR path 23 for recirculating part of exhaust toward the intake side. The word "EGR" means Exhaust Gas Recirculation. The high-pressure EGR path 20 connects the exhaust path 13 upstream of the turbocharger 14 with the intake path 12 downstream of the high-pressure throttle valve 19. The high-pressure EGR path 20 is provided with a high-pressure EGR cooler 21 and a high-pressure EGR valve 22 disposed on the path. The low-pressure EGR path 23 connects the exhaust path 13 downstream of the turbocharger 14 with the intake path 12 upstream of the intercooler 18. The low-pressure EGR path 23 is provided with a low-pressure EGR filter 24, a low-pressure EGR cooler 25, and a low-pressure EGR valve 26 disposed on the path. The high-pressure EGR valve 22 and the low-pressure EGR valve 26 open variably.

The engine 10 includes an engine speed sensor 31 that is disposed near a crankshaft and detects an engine speed Ne. The engine speed Ne is the number of revolutions of the engine 10 per unit time. The intake path 12 is provided with a pressure sensor 32 and an oxygen level sensor 33. The pressure sensor 32 detects the pressure (boost pressure in supercharging) of intake air to be introduced into the cylinder. The oxygen level sensor 33 detects the oxygen level of intake air. Both sensors are disposed downstream of the high-pressure throttle valve 19.

The vehicle includes, at certain positions, an accelerator-pedal position sensor 34 detecting the amount of depression of an accelerator pedal (accelerator-pedal position) and a gear-stick position sensor 35 detecting the operation position of a gear stick. The operation position of the gear stick corresponds to one of the gear positions (for example, first gear, second gear, . . . , and sixth gear) of a transmission mounted in the vehicle. As the ordinal number increases (from a lower position toward a higher position), the reduction ratio decreases. The information detected by the sensors 31-35 is sent to the engine controller 1.

[2. Engine Controller]

The vehicle equipped with the engine 10 includes the engine controller 1 (engine electronic control unit). The engine controller 1 controls a wide variety of systems, such as an ignition system, a fuel system, an intake/exhaust system, and a valve system, and controls the rate of air flow into the cylinders of the engine 10, a fuel injection rate, a fuel injection timing, and the amount of EGR gas, on the engine 10. The engine controller 1 is connected to other electronic controllers, such as a transmission ECU, an air-conditioner ECU, a brake ECU, a vehicle-control ECU, and a vehicle-body ECU, and the sensors 31-35 via an on-vehicle network.

The engine controller 1 is an electronic integrated device including, for example, a microprocessor, such as a central processing unit (CPU) and a MPU (Micro Processing Unit), read-only memory (ROM), random-access memory (RAM), and nonvolatile memory. The microprocessor includes a control unit (control circuit), an arithmetic unit (arithmetic circuit), and cache memory (registers). The ROM, RAM and nonvolatile memory store programs and data being worked on. The engine controller 1 memorizes content of control as an application program, for example, in the ROM, RAM, and nonvolatile memory, and a removable medium. After the content of the program is loaded into memory space in the RAM, the microprocessor executes the program.

The engine controller 1 in accordance with this embodiment performs "combustion switching control" that switches the premixed combustion operation and the diffusion combustion operation in accordance with the traveling state of the vehicle. The traveling state of the vehicle is determined on the basis of the information detected by the sensors 31-35, for example. With reference to FIGS. 2A and 2B, the combustion states (the premixed combustion and the diffusion combustion) in the cylinder are switched through control of the fuel injection rate and the fuel injection timing and adjustment of the air flow rate and the amount of EGR gas. The premixed combustion operation and the diffusion combustion operation may be switched by varying at least any of the fuel injection rate, the fuel injection timing, the air flow rate, and the amount of EGR gas.

The engine controller 1 includes a detector 2, a map storage 3, a changer 4, a condition determiner 5, and a controller 6, for executing the combustion switching control.

The detector 2 detects the current gear position of the transmission on the basis of the information on the operation position of the gear stick detected by the gear-stick position sensor 35. The elapsed time from when the gear position has changed to the current position is measured and detected when the operation position of the gear stick is shifted. The information on the gear position and the elapsed time is sent to the changer 4.

The map storage 3 stores a control map containing the correlations between the traveling state of the vehicle and the combustion state. The traveling state of the vehicle is determined on the basis of at least one, preferably both of the engine load Ec and speed Ne. The engine load Ec is a parameter corresponding to an output request to the engine 10 and calculated on the basis of the accelerator-pedal position detected by the accelerator-pedal position sensor 34, the vehicle speed, the air flow rate, the intake pressure, and the boost pressure, for example. The engine load Ec in this embodiment refers to the volumetric or charging efficiency of the engine 10. It is preferred that the traveling state of the vehicle be determined in consideration of the outside temperature, outside pressure, and engine-cooling water temperature.

Figure 3:
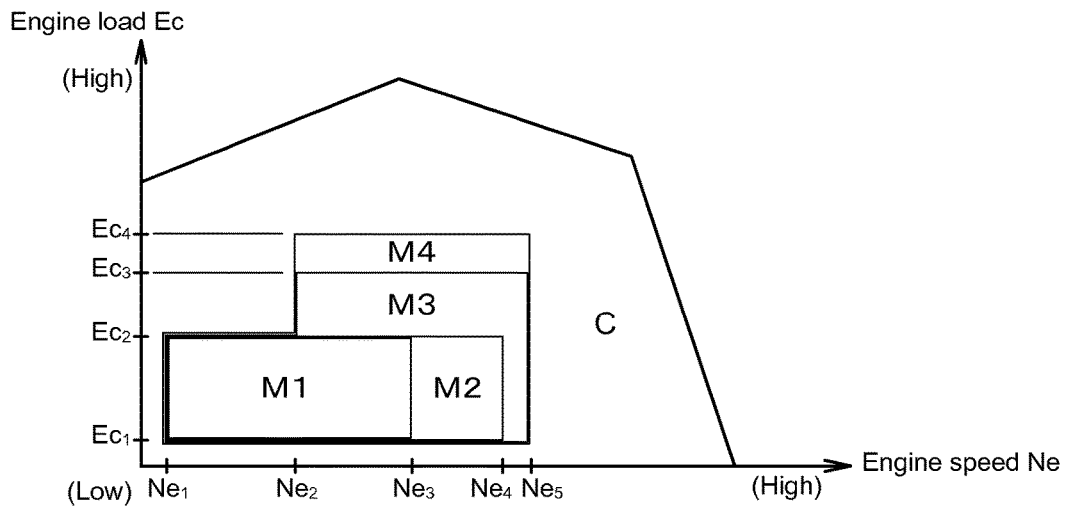
FIG. 3 illustrates an example map for switching premixed combustion and diffusion combustion.

With reference to FIG. 3, the control map in this embodiment contains the correlations between the combustion state and the operating point determined by the engine load Ec and speed Ne and for each gear position. The region M1 indicates the area in which the premixed combustion operation is performed when the operation position of the gear stick is in the first gear. The region M2 including the region M1 indicates the area in which the premixed combustion operation is performed when the operation position is in the second gear. In like manner, the region M3 including the regions M1 and M2 indicates the area in which the premixed combustion operation is performed when the operation position is in the third gear. The region M4 including the regions M1-M3 indicates the area in which the premixed combustion operation is performed when the operation position is in the fourth or higher gear. The region C outside the regions M1-M4 indicates the area in which the diffusion combustion operation is performed (that is, the premixed combustion operation is not performed) in any gear position Table 1 shows the correlations between the engine load Ec and the regions M1-M4 and between the engine speed Ne and the regions M1-M4. The quantitative relationships of $Ne_1$-$Ne_5$ and $Ec_1$-$Ec_4$ are expressed by $Ne_1 < Ne_2 < Ne_3 < Ne_4 < Ne_5$ and $Ec_1 < Ec_2 < Ec_3 < Ec_4$, respectively. These values may be default values (constant, fixed values) or variables (variable values) calculated on the basis of traveling conditions of the vehicle, such as the outside temperature, outside pressure, and engine-cooling water temperature.

TABLE 1

|  | Engine Speed Ne | Engine Load Ec |
|---|---|---|
| Region M1 | $Ne_1 \leq Ne \leq Ne_3$ | $Ec_1 \leq Ec \leq Ec_2$ |
| Region M2 | $Ne_1 \leq Ne \leq Ne_4$ | $Ec_1 \leq Ec \leq Ec_2$ |
| Region M3 | $Ne_1 \leq Ne \leq Ne_2$ | $Ec_1 \leq Ec \leq Ec_2$ |
|  | $Ne_2 \leq Ne \leq Ne_5$ | $Ec_1 \leq Ec \leq Ec_3$ |
| Region M4 | $Ne_1 \leq Ne \leq Ne_2$ | $Ec_1 \leq Ec \leq Ec_2$ |
|  | $Ne_2 \leq Ne \leq Ne_5$ | $Ec_1 \leq Ec \leq Ec_4$ |

The region of the premixed combustion operation on the map expands as the ordinal number of gear positions increases. For example, the region for the premixed combustion operation expands in the direction of the increasing engine speed Ne (to the right) in the second gear, in comparison with in the first gear. This indicates that the upper limit of the engine speed Ne among the operational conditions of the premixed combustion operation increases as the reduction ratio of the gear position decreases.

The region for the premixed combustion operation expands in the direction of the increasing engine load Ec (upward) in addition to the direction of the increasing engine speed Ne (to the right) in the third gear, in comparison with in the second gear. This indicates that the upper limit of the engine load Ec among the operational condition of the premixed combustion operation increases as the reduction ratio of the gear position decreases.

The reduction ratio in the first gear is referred to as a first reduction ratio and the second gear a second reduction ratio. The second reduction ratio is lower than the first reduction ratio.

The region for the premixed combustion operation is determined such that the upper limit of the engine speed Ne is higher at a reduction ratio below the first reduction ratio (for example, in the second gear) than at a reduction ratio equal to or above the first reduction ratio (for example, in the first gear) ($Ne_4 > Ne_3$).

The region for the premixed combustion operation is determined such that the upper limit of the engine load Ec is higher at a reduction ratio below the second reduction ratio (for example, in the third gear) than at a reduction ratio equal to or above the second reduction ratio (for example, in the second gear) ($Ec_3 > Ec_2$).

The region for the premixed combustion operation expands in two directions, the direction of the increasing engine speed Ne (to the right) and the direction of the increasing engine load Ec (upward) on the map. The increasing ordinal number of gear positions expands the region for the premixed combustion operation, not in these two directions equally, but in the direction of the increasing engine speed Ne in priority to the direction of the increasing engine load Ec. That is, the third gear is the lowest gear position in which the region for the premixed combustion operation expands in the direction of the increasing engine load Ec, and the second gear, having a higher reduction ratio than the third gear, is the lowest gear position in which the region expands in the direction of the increasing engine speed Ne. Such map setting enables the region for the premixed combustion operation to expand in the direction to prevent the generation of noise from the engine 10.

The changer 4 changes the operational conditions of the premixed combustion operation on the basis of the gear position detected at the detector 2. The changer has the function to determine the region for the premixed combustion operation among the regions M1-M4 on the control map stored in the map storage 3.

For example, in the first gear, the premixed combustion operation is performed in the region M1 ($Ne_1 \leq Ne \leq Ne_3$ and $Ec_1 \leq Ec \leq Ec_2$). In the third gear, the premixed combustion operation is performed in the region M3 ($Ne_1 \leq Ne \leq Ne_2$ and $Ec_1 \leq Ec \leq Ec_2$, or $Ne_2 \leq Ne \leq Ne_5$ and $Ec_1 \leq Ec \leq Ec_3$). The information on these inequalities indicating the region for the premixed combustion operation is sent as the operational conditions of the premixed combustion operation to the condition determiner 5.

The condition determiner 5 determines whether the traveling state of the vehicle satisfies the operational conditions of the premixed combustion operation. In this embodiment, the condition determiner 5 determines whether the operational conditions of the premixed combustion operation are satisfied on the basis of the current engine speed Ne and load Ec. For example, in the first gear, it is determined whether the current engine speed Ne satisfies $Ne_1 \leq Ne \leq Ne_3$ and whether the current engine load Ec satisfies $Ec_1 \leq Ec \leq Ec_2$. The results of the determination are sent to the controller 6.

The controller 6 performs the combustion switching control on the basis of the results of determination at the condition determiner 5. Basically, the premixed combustion operation is performed when the operational conditions of the premixed combustion operation are satisfied. Immediately after the gear position is changed in the transmission; however, the air flow rate, the amount of EGR gas, and the operating point of the engine 10 vary transiently, causing an unstable combustion state. Thus, after the gear position is changed and before a predetermined period (predetermined time) $T_0$ elapses, the premixed combustion operation is forbidden and the diffusion combustion operation is performed, regardless of the determination of the operational conditions of the premixed combustion operation.

The predetermined period $T_0$ may be determined in accordance with, for example, the following schemes:

Scheme 1: A default value (for example, a few seconds) is applied;

Scheme 2: A variable determined in accordance with the traveling state of the engine 10 is applied; and Scheme 3: A elapsed time for stabilizing the boost pressure and intake-air oxygen level of the engine 10 is applied.

Scheme 3 can prevent the combustion stability from lowering due to delays in intake and supercharge. For example, the predetermined period $T_0$ is determined by the time required until the differences between the target values and the actual values of the boost pressure and intake-air oxygen level are equal to or smaller than predetermined values. That is, the predetermined period $T_0$ is set in accordance with a convergence period. The actual values of the boost pressure and intake-air oxygen level may be values detected by the pressure sensor 32 and the oxygen level sensor 33. The target values of the boost pressure and intake-air oxygen level may be calculated on the basis of, for example, the accelerator-pedal position, vehicle speed, air flow rate, and intake pressure.

Figure 4:
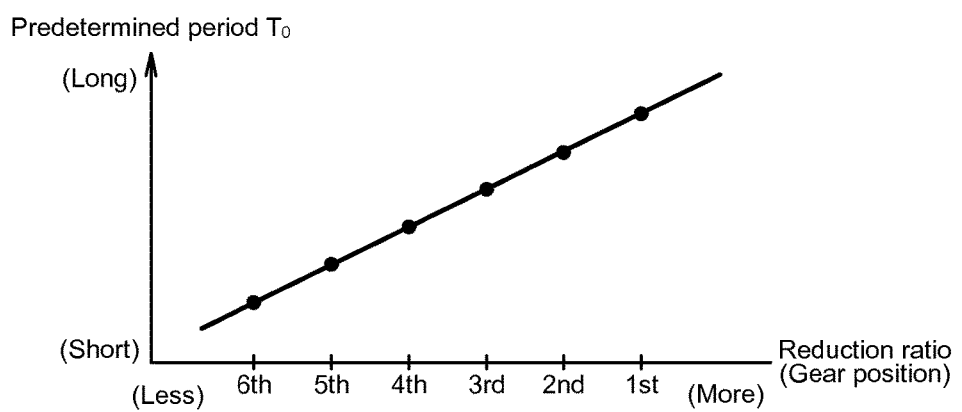
FIG. 4 is a graph showing the correlations between the reduction ratio and the predetermined time.

This embodiment employs Scheme 2 in which the predetermined period $T_0$ is determined shorter as the reduction ratio decreases. FIG. 4 illustrates the correlations between the reduction ratio and the predetermined period $T_0$. As the ordinal number of gear positions decreases, the elapsed time for determining the start conditions of the premixed combustion operation extends. As the ordinal number of gear positions increases, the time shortens. This is because the combustion state is less stable in a higher reduction ratio than in a lower reduction ratio.

In the premixed combustion operation, the controller 6 outputs a control signal to the direct injection valve 11 so as to achieve the fuel injection pattern in FIG. 2B, for example. The controller 6 controls the low-pressure throttle valve 17, high-pressure throttle valve 19, high-pressure EGR valve 22, and low-pressure EGR valve 26 such that the ratio of the amount of EGR gas to the total air flow rate is higher than in the diffusion combustion operation. In the diffusion combustion operation, the controller 6 outputs a control signal to the direct injection valve 11 so as to achieve the fuel injection pattern in FIG. 2A, for example.

[3. Flowchart]

FIG. 5 is an example flowchart of the procedure of the combustion switching control. This flowchart is repeated by the engine controller 1 with predetermined computing cycles.

In Step A1, the detector 2 retrieves the information on the current gear position. Proceeding to Step A2, the gear positions in the previous and current cycles are compared with each other to determine whether the gear stick is operated. The satisfaction of this condition starts a timer T indicating an elapsed time after the start of the current gear position in Step A3, and then the procedure proceeds to Step A4. If the gear stick is not operated, the procedure skips Step A3 and proceeds to Step A4.

In Step A4, the controller 6 determines the predetermined period $T_0$ in accordance with the current gear position. The predetermined period $T_0$ shortens as the ordinal number of gear positions increases. Step A5 compares the value of the timer T with the predetermined period $T_0$ to determine whether the predetermined period $T_0$ elapses after the operation of the gear stick. If the inequality $T<T_0$ is satisfied (that is, if the predetermined period $T_0$ does not elapse after the operation of the gear stick), the controller 6 performs the diffusion combustion operation in Step A10, regardless of the determination of the operational conditions of the premixed combustion operation. If the inequality $T \geq T_0$ is satisfied, the procedure proceeds to Step A6.

In Step A6, the timer T stops counting because of the elapse of the predetermined period $T_0$. Proceeding to Step A7, the operational conditions of the premixed combustion operation is determined in accordance with the current gear position. For example, in the second gear, the operational condition of the premixed combustion operation is that the operating point of the engine 10 is in the region M2 in FIG. 3. In the third gear, the region M3 in FIG. 3 is determined as the region for the premixed combustion operation. In this way, the region for the premixed combustion operation is varied on the basis of the gear position of the transmission.

In Step A8, the condition determiner 5 determines whether the operational conditions of the premixed combustion operation are satisfied. If the operational conditions are satisfied, the controller 6 performs the premixed combustion operation in Step A9. If the operational conditions are not satisfied, the diffusion combustion is performed in Step A10. In this way, the premixed combustion operation is performed when the condition of the elapsed time after the gear stick is operated and the operational conditions determined in accordance with the gear position are satisfied.

[4. Advantageous Effect]

(1) In the engine controller 1, the operational conditions of the premixed combustion operation are changed depending on the gear position of the transmission. This enables switching between the premixed combustion operation and the diffusion combustion operation in consideration of differences in traveling sound and operation sound among the gear positions. The engine controller 1 accurately determines such a traveling state that the sound generated at the engine 10 is readily masked by sound other than that from the engine 10, for example, a traveling state in which noise generated in the premixed combustion operation is readily blocked. This improves the emission performance and riding comfort and thus improves the emission performance and quietness of the vehicle.

(2) As illustrated in FIG. 3, the engine controller 1 expands the region for the premixed combustion operation in the direction of the increasing engine speed Ne (to the right) as the reduction ratio of the transmission decreases. The engine controller 1 increases the upper limit of the engine speed Ne for performing the premixed combustion operation such that the premixed combustion operation is performed at a high speed of the engine 10. This operation improves the emission performance. Traveling sound readily blocks noise generated in the premixed combustion operation at a high speed of the engine 10, resulting in an improvement in riding comfort.

(3) As illustrated in FIG. 3, the engine controller 1 expands the region for the premixed combustion operation in the direction of the increasing engine load Ec (upward) as the reduction ratio of the transmission decreases. The engine controller 1 increases the upper limit of the engine load Ec for performing the premixed combustion operation such that the premixed combustion operation is performed with a high load of the engine 10. This control improves the emission performance. Traveling sound readily blocks noise generated in the premixed combustion operation with a high load of the engine 10, resulting in an improvement in riding comfort.

(4) As illustrated in FIG. 3, the second gear is the lowest gear position in which the region for the premixed combustion operation expands in the direction of the increasing engine speed Ne (to the right). The third gear is the lowest gear position in which the region for the premixed combustion operation expands in the direction of the increasing engine load Ec (upward). The engine load Ec has higher priority over the engine speed Ne as to increasing the upper limits thereof; thus, the premixed combustion operation is performed in a traveling state having fine noise block effect, which further improves the riding comfort.

(5) The engine controller 1 determines that the premixed combustion operation is performed when at least the predetermined period $T_0$ elapses after a change in the gear position. This enables the diffusion combustion operation to be performed if the air flow rate or the amount of EGR gas varies transiently immediately after a change in the gear stick, for example, thus ensuring the combustion stability. The controller starts the premixed combustion operation, avoiding an unstable combustion state immediately after a change in the gear stick. This control improves the combustion stability of the engine 10.

(6) The predetermined period $T_0$ is determined shorter as the reduction ratio of the gear position decreases. This improves the combustion stability of the engine 10 and enables prompt start of the premixed combustion operation.

(7) Scheme 3, if employed as the scheme of determining the predetermined period $T_0$, prevents the combustion stability from lowering because of delays in intake and supercharge, improving the combustion stability of the engine 10 in the premixed combustion operation.

[5. Modifications]

The invention should not be limited to the above embodiments and examples. Various modifications may be made without departing from the scope of the invention. The configurations in the embodiments may be selected as needed or combined appropriately.

In the above embodiments, the correlations between the operating point and the combustion state are defined in the example map in FIG. 3. Instead, the regions M1-M4 may have any shape, and/or any number of regions may be present on the map. Especially, the preferred shapes of the regions M1-M4 are determined in consideration of the traveling characteristics of the vehicle and the riding comfort.

The map in FIG. 3 contains the correlations between the operating point in accordance with the engine speed Ne and load Ec and the regions M1-M4. The traveling state of the vehicle may be determined on the basis of at least one of the engine load Ec and speed Ne. The operating point and the combustion state may be correlated with each other using inequalities or equations as shown in Table 1, for example.

The above embodiments describe the control of diesel engines; however, the control maybe applied to gasoline engines. An engine performing at least a premixed combustion operation and a diffusion combustion operation that are switchable in accordance with the traveling state of a vehicle achieves the same advantageous effects as in the embodiments.

The invention thus described, it will be obvious that the same may be varied in many ways. Such variations are not to be regarded as a departure from the scope of the invention, and all such modifications as would be obvious to one skilled in the art are intended to be included within the scope of the following claims.

REFERENCE SIGNS LIST 1 engine controller
2 detector
3 map storage
4 changer
5 condition determiner
6 controller
10 engine
11 direct injection valve
12 intake path
13 exhaust path
14 turbocharger
15 exhaust emission controller
15A DOC
15B DPF
16 air cleaner
17 low-pressure throttle valve
18 intercooler
19 high-pressure throttle valve
20 high-pressure EGR path
21 high-pressure EGR cooler
22 high-pressure EGR valve
23 low-pressure EGR path
24 low-pressure EGR filter
25 low-pressure EGR cooler
31 engine speed sensor
32 pressure sensor
33 oxygen level sensor
34 accelerator-pedal position sensor
35 gear-stick position sensor

The invention claimed is:

1. An engine controller that performs a premixed combustion operation and a diffusion combustion operation and switches between the premixed combustion operation and the diffusion combustion operation in accordance with a traveling state of a vehicle, the engine having at least one of a fuel injection valve that injects fuel directly into a combustion chamber, a throttle valve that controls an amount of air provided to the combustion chamber, and an EGR valve that controls an amount of exhaust gas supplied from an exhaust passage to an intake passage of the engine, the engine controller comprising:
 a processor and a memory that stores a program that causes the processor to:
 detect, as a detector, a gear position of a transmission mounted in the vehicle;
 change, as a changer, operational conditions of the premixed combustion operation on the basis of the detected gear position; and
 control, as a controller, at least one of the fuel injection valve and the throttle valve and the EGR valve to perform the premixed combustion operation when the traveling state of a vehicle satisfies the operational condition,
 wherein the memory stores a map that determines a region for performing the premixed combustion operation based on an engine speed and an engine load, the region for performing the premixed combustion operation on the map expands as an ordinal number of gear positions increases.

2. The engine controller according to claim 1, wherein the changer increases an upper limit of engine speed among the operational conditions as a reduction ratio of the gear position decreases.

3. The engine controller according to claim 2, wherein the changer increases the upper limit of the engine speed among the operational conditions if the reduction ratio is lower than a first reduction ratio, compared to the case where the reduction ratio is equal to or higher than the first reduction ratio, and increases an upper limit of the engine load among the operational conditions if the reduction ratio is lower than a second reduction ratio lower than the first reduction ratio, compared to the case where the reduction ratio is equal to or higher than the second reduction ratio.

4. The engine controller according to claim 2, wherein the changer increases the upper limit of the engine load among the operational conditions if the reduction ratio of the gear position decreases.

5. The engine controller according to claim 1,
 wherein the controller performs the diffusion combustion operation after the gear position is changed and at least before a predetermined time elapses.

6. The engine controller according to claim 2,
 wherein the controller performs the diffusion combustion operation after the gear position is changed and at least before a predetermined time elapses.

7. The engine controller according to claim 3,
 wherein the controller performs the diffusion combustion operation after the gear position is changed and at least before a predetermined time elapses.

8. The engine controller according to claim 7, wherein the predetermined time decreases as the reduction ratio of the gear position decreases.

9. The engine controller according to claim 8, wherein the predetermined time is a time until a difference between a target value and an actual value of each of a boost pressure and an intake-air oxygen level of the engine is equal to or smaller than a predetermined value.

10. A vehicle equipped with an engine that selectively operates in a premixed combustion operation and a diffusion combustion operation in accordance with a traveling state of the vehicle, the engine having at least one of a fuel injection valve that injects fuel directly into a combustion chamber, a throttle valve that controls an amount of air provided to the combustion chamber, and an EGR valve that controls an amount of exhaust gas supplied from an exhaust passage to an intake passage of the engine, the vehicle comprising:
 a gear position sensor that detects a position of a gear selector; and
 a processor and a memory that stores a program that causes the processor to:
 detect, as a detector, a gear position of a transmission mounted in the vehicle based on the detected position of the gear selector;
 change, as a changer, operational conditions of the premixed combustion operation on the basis of the detected gear position; and
 control, as a controller, at least one of the fuel injection valve and the throttle valve and the EGR valve to perform the premixed combustion operation when the traveling state of the vehicle satisfies the operational condition,
 wherein the memory stores a map that determines a region for performing the premixed combustion operation based on an engine speed and an engine load, the region for performing the premixed combustion operation on the map expands as an ordinal number of gear positions increases.

* * * * *